United States Patent [19]

Hivner

[11] Patent Number: 5,092,663
[45] Date of Patent: Mar. 3, 1992

[54] APPARATUS AND METHOD FOR MAINTAINING SLACK OF FIBER OPTIC CABLE OR THE LIKE

[75] Inventor: Michael L. Hivner, Red Lion, Pa.

[73] Assignee: GTE North Incorporated, Westfield, Ind.

[21] Appl. No.: 526,875

[22] Filed: May 21, 1990

[51] Int. Cl.⁵ .................................... G02B 6/44
[52] U.S. Cl. .................................... 385/100; 24/115 J; 24/129 A; 174/40 TD; 174/41; 174/45 TD; 385/135; 385/136
[58] Field of Search .................. 350/96.2, 96.23; 24/115 J, 129.9, 135.9; 174/40 TD, 40 CC, 41, 45 TD

[56] References Cited

U.S. PATENT DOCUMENTS

| | | | |
|---|---|---|---|
| 4,494,822 | 1/1985 | Harvey | 350/96.23 X |
| 4,795,856 | 1/1989 | Farmer | 174/40 R |
| 4,832,442 | 5/1989 | Pappas | 350/96.23 |
| 4,856,867 | 8/1989 | Gaylin | 350/96.23 |
| 4,900,123 | 2/1990 | Barlow et al. | 350/96.2 |

Primary Examiner—John D. Lee
Assistant Examiner—Stephen W. Barns
Attorney, Agent, or Firm—Brian M. Sakima

[57] ABSTRACT

An apparatus for supporting and maintaining slack of fiber optic cable or the like in an aerial installation comprises an elongate channel member having an arcuate section and a plurality of linear sections for receiving the slack and means for securing the apparatus to a messenger cable support structure. Methods for supporting and maintaining the slack in two preferred embodiments are also disclosed.

22 Claims, 2 Drawing Sheets

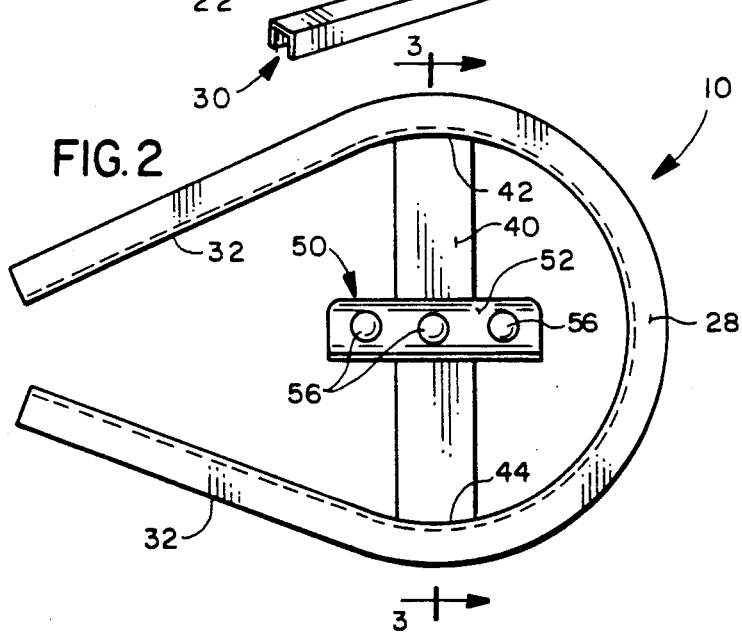
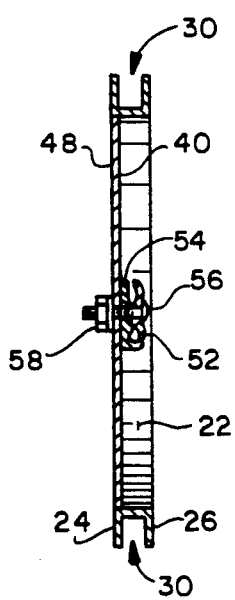
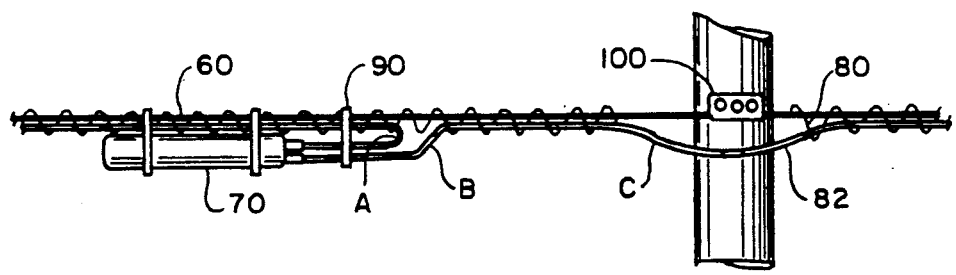

APPARATUS AND METHOD FOR MAINTAINING SLACK OF FIBER OPTIC CABLE OR THE LIKE

FIELD OF THE INVENTION

This invention relates to support apparatus, and more particularly to an apparatus and method for maintaining slack of fiber optic cable or the like when such cable is aerially installed on utility poles or other support structure.

BACKGROUND OF THE INVENTION

Developments in lightwave technology continue today at a rapid pace. Such advances have improved the system performance and reduced the cost of fiber optic cables and associated optoelectronic equipment, which carry information over hair-thin strands of glass instead of conventional metallic media. Consequently, because of these considerations and additional performance advantages as well, fiber optic cable has supplanted copper wire as the preferred transmission medium in many telecommunications applications.

Initially, fiber optic cable was installed only in long-distance, intercity networks and interoffice trunks. Today, however, such cable is being placed in the local loop feeder network. Future applications will extend fiber optic cable for distribution to the customer premises itself. In fact, a proliferation of new information services is now available, or is being proposed for the office and home by local tel.-e phone companies and cable TV companies, to take advantage of the high communication capacity that fiber optic cable offers. Such interactive services include, for example, local area networks (LANs), educational and entertainment video, energy management, alarm monitoring, home banking, and videotext.

Relief of congested transmission facilities and demand for the above-identified information services will require placement of new fiber optic facilities, especially aerial cable installations in less-populated areas, where such facilities are geographically dispersed, where terrain or construction conditions so dictate, or where other economic reasons dictate.

Notwithstanding the advantages of fiber optic cable and increased demand, there are still drawbacks to universally using fiber optic cable instead of conventional metallic media. First, fiber optic cable is more fragile than copper wire or coaxial cable. In addition, fiber optic cable is more sensitive to pulling, bending and crushing forces. Accordingly, fiber optic cable demands more stringent installation and maintenance techniques than those media.

The most one important fiber optic cable parameter is its bending radius. When a fiber optic cable is being installed, and when it is finally in place, the cable must not be bent less than the minimum cable bending radius specified by the manufacturer. If the cable is otherwise mishandled, portions of the cable have to be replaced because broken, crushed or kinked cables result in degraded transmission performance.

The time and expense (and inconvenience to customers as well) associated with replacing or relocating aerially-installed fiber optic cable is substantial. This is due to high manpower requirements and the use of expensive equipment needed to install, test and maintain such transmission facilities. Those skilled in the art have not yet addressed the need to reduce the costs and inefficiencies associated with such activity after initial installation of fiber optic cable is completed. Known patents in this field have not been directed to these concerns. For example U.S. Pat. No. 4,856,867 to Gaylin (1989) discloses a flexible sheath support assembly and a method of supporting a fiber optic cable from a messenger strand using that sheath assembly.

U.S. Pat. No. 4,795,856 to Farmer (1989) discloses another apparatus for supporting fiber optic cable on a utility pole using bifurcated arms and helical ties.

Finally, U.S. Pat. No. 4,832,442 to Pappas (1989) discloses another method and apparatus for the aerial installation of long-haul cable facilties. None of these prior art inventions teaches a device or a method that facilitates the repair or relocation of aerially-installed fiber optic cable that needs servicing after installation.

One novel way of minimizing, or even obviating, downtime when undertaking such activity is by providing, during the initial installation of the fiber optic cable, a section of cable slack. When repair or relocation work becomes necessary, cable slack is then readily available at the given location, and long spans of installed cable need not be affected. Thus, the present invention provides a unique solution to the problems discussed above.

It is therefore an object of the present invention to provide a novel apparatus and method that will inexpensively support and maintain slack of a fiber optic cable in an aerial installation.

Additional objects and advantages of the invention will be set forth in the description which follows.

SUMMARY OF THE INVENTION

To achieve the foregoing objects and advantages, and in accordance with the purposes of the invention as embodied and broadly described herein, an apparatus for supporting and maintaining slack of fiber optic cable in an aerial installation comprises an elongate channel member for receiving the slack and a lip clamp for securing the apparatus to a messenger cable support structure.

Methods for supporting and maintaining the slack in two preferred embodiments of the invention are also disclosed.

The accompanying drawings, which are incorporated in and constitute a part of the specification, illustrate preferred embodiments of the invention and, together with the general description given above and the detailed description of the preferred embodiments below, serve to explain the principles of the invention.

BRIEF DESCRIPTION OF THE DRAWINGS

The novel features of the present invention may be better understood from the following description when taken in conjunction with the accompanying drawings in which:

FIG. 1 illustrates a perspective view of an apparatus for maintaining slack of fiber optic cable or the like according to the present invention;

FIG. 2 illustrates a rear elevational view of the apparatus of FIG. 1;

FIG. 3 illustrates a sectional view of the present invention taken on line 3—3 of FIG. 2;

FIG. 4 illustrates a prior art fiber optic cable aerial installation where no apparatus as in the present invention is utilized;

DETAILED DESCRIPTION OF THE PREFERRED EMBODIMENTS

The present invention comprises an apparatus and method for maintaining slack of fiber optic cable or the like in an aerial installation. As used throughout this Specification, "slack" refers to any excess length of cable, wire, or the like which allows excessive sag.

Turning first to FIGS. 1 and 2, a perspective view and a front elevational view, respectively, of a preferred embodiment of an apparatus 10, constructed according to the present invention, is illustrated.

Apparatus 10 comprises an elongate member 20, a support member 40 and a coupling member 50. Each of these three members of apparatus 10 is comprised of standard stock materials that are readily available in the telecommunications industry. Accordingly, the relatively few parts necessary to assemble the apparatus and its simple design minimize the cost of manufacturing the invention.

Figure 5:
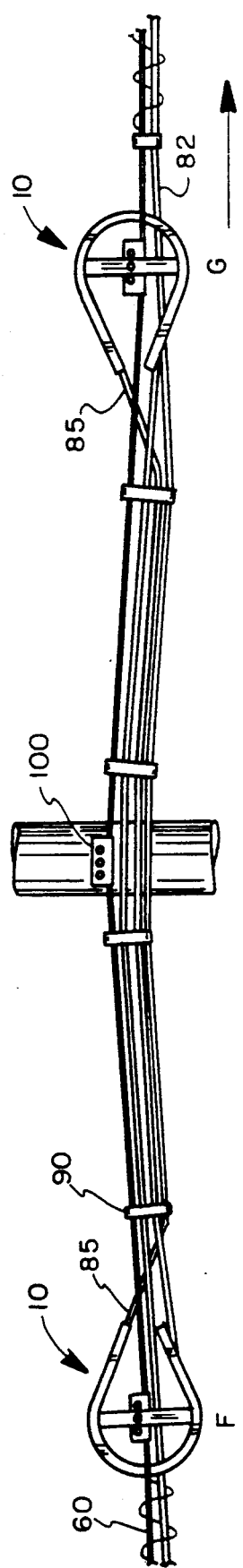
FIG. 5 illustrates an aerial fiber optic cable installation utilizing the present invention.
Figure 6:
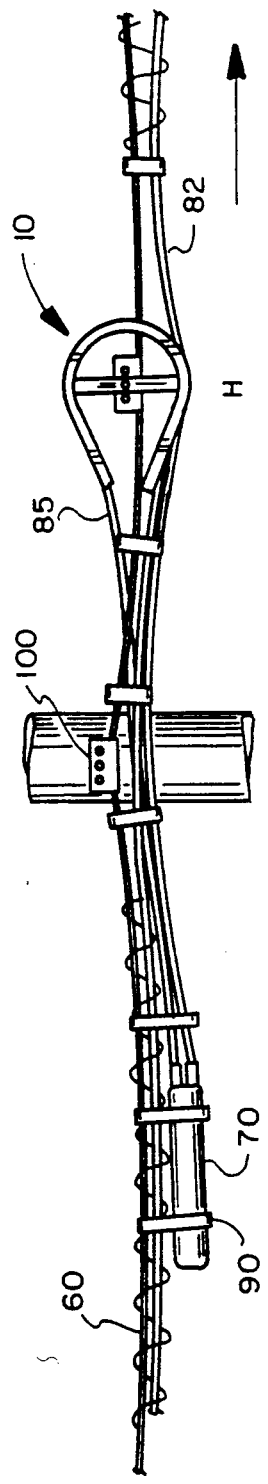
FIG. 6 illustrates an aerial fiber optic cable installation at a splice location utilizing the present invention.

As seen in FIGS. 5 and 6, and more fully described below, apparatus 10 is utilized in an aerial installation of fiber optic cable 82, whereby a predetermined length of slack 85 is maintained as part of the cable's initial installation.

In the preferred embodiment of the apparatus, elongate member 20 is formed from standard extruded aluminum stock, Type 6063T52. Such aluminum stock is available in lengths of various dimension. Here, the aluminum stock is cut into lengths of approximately 40". Elongate member 20 has a bottom surface 22, and opposing side walls 24, 26 extending upwardly from each side thereof. Bottom surface 22 and side walls 24, 26 form a channel 30 in which slack 85 is received. The bottom surface and each of the side walls is 1" wide and ¼" thick. Thus, the channel 30 has a square cross section approximately 1" on each side.

Further illustrated in FIGS. 1 and 2, elongate member 20 is shaped to form an arcuate section 28 and two linear sections 32. The shaping of the elongate member is accomplished by well-known manufacturing processes. Arcuate section 28 is substantially semi-circular in shape, and has an inner radius of approximately 6". The linear sections are each approximately 12" in length. The overall length of the apparatus is approximately 18" and the overall width of the apparatus is approximately 12".

A support member 40 extends across the diametrically-opposed ends 42, 44 of arcuate section 28. Support member 40 is constructed of standard 2" by ¼" aluminum bar. The support member is typically welded, or attached by other suitable methods, to elongate member 20. As seen in FIG. 3, support member 40 is attached to elongate member 20 so that the front surface 48 of the support member 40 is coplanar with the front surface of the elongate member 28.

Although 1" aluminum channel is preferred because it is relatively inexpensive and readily available, any rigid material can be used. Moreover, channel 30, which receives the fiber optic cable slack 85, is not limited to a 1" square cross section. The channel can be dimensioned to receive a fiber optic cable of any given size, depending upon the specific application.

Coupling member 50 is attached to support member 40 at hole 46. Coupling member 50 is preferably a three-bolt lip clamp, available from Joslyn Manufacturing & Supply Company of Chicago, Ill. Lip clamp 50 comprises an upper lip 52 and a lower lip 54. Messenger cable 60 is disposed and engaged between upper lip 52 and lower lip 54. Clamp 50 is secured together with rail bolts 56 and square-head nuts 58. Preferably, the rail bolts are ⅝" by 2" in size, part no. PB217; the square-head nuts are 11⅝", part no. PB272. Both parts are available from Stanley G. Flagg & Company, Inc. of Stowe, Pa. The aluminum channel member and aluminum bar are available from Edgecomb Steel Co. of York, Pa.

The fiber optic cable typically placed in aerial installations is a single-mode, dielectric central member, non-armored loose tube type similar to that manufactured by Siecor Corporation of Hickory, N.C. Comparable fiber optic cable manufactured by other cable suppliers can also be utilized. Such cables typically contain from 4 to 144 fibers. Table I shows data for various illustrated cables, cable diameters and minimum bend radii for both short-term (i.e., during installation) and long-term (i.e., as-installed) applications.

It is seen that for the entire range of available fiber optic cable used in typical aerial installations, the cable diameter is no larger than 0.81". The corresponding minimum bend radius of such cable is 9.8". Accordingly, the dimensions of the preferred embodiment of the present invention can satisfactorily accommodate almost the entire range of fiber optic cables presently available for aerial installation, with minor variations.

FIG. 4 illustrates a typical fiber optic cable prior art aerial installation. The support structure includes a messenger cable 60, which is strung 18' to 23' above the ground. Messenger cable 60 typically is a 6M or ¼" diameter strand and is secured to the utility pole by mounting devices 100. Lashing tie 80 and cable support 90 are used to secure splice enclosure 70 and fiber optic cable 82 to the messenger.

Here, note that only minimal slack is provided at points A and B. Multiple coils of slack are not recommended because there is no way to maintain the proper minimum bend radius of the installed fiber optic cable.

Note further that in this prior art aerial installation, only a similarly minimal length of slack is provided at point C. This slack is provided, not for the purpose of facilitating maintenance or relocation of an installed fiber optic cable, but merely for the normal expansion and contraction of the installed cable due to external weather conditions.

Turning now to FIGS. 5 and 6, illustrated therein are two preferred aerial installations utilizing the apparatus and the methods of the present invention. In FIG. 5, it is assumed that fiber optic cable 82 originates from the left side of the drawing and that it has been pulled in the direction as shown by the arrow; i.e., the cable has been pulled (at least initially) from left to right. To begin with, an apparatus 10 is attached to the messenger cable 60 at opposite sides of the utility pole. The location of each apparatus along the messenger cable depends upon the amount of slack desired at that location. For example, if 60' of slack is needed at that site, then each of the two apparatus is placed about 15' from the utility pole.

Fiber optic cable 82 is first drawn toward the first apparatus at point G. Cable 82 is then guided into the channel 30 of the first apparatus 10 starting at the lower linear section, then looping around the arcuate section, and exiting toward the second apparatus 10 at the upper linear section of the first apparatus.

Cable 82 is then pulled toward the second apparatus at point F, and is similarly looped into the second channel, first into the lower linear section thereof and then exiting from the upper linear section. Cable 82 is then pulled again to the right toward the terminating end of the cable. After the requisite tensile load is applied to the installed cable, each apparatus is secured to the messenger cable. In this example, approximately 60' of slack is provided during the initial installation of the fiber optic cable for future maintenance and repair.

It is therefore clearly illustrated that by using the present invention, slack can be easily installed and maintained at the minimum bend radius, at any convenient location along the cable route. For example, "preferable" locations where slack may be maintained include areas where there is: clear pole space; easy entrance and exit; public area, or area accessible to splicing vehicles, tools and test equipment.

On the other hand, locations where slack would be less desirable include areas where there is/are: safety hazards; private property; intersections; already-existing congested aerial plant; or trees and vegetation.

Turning finally to FIG. 6, there is shown an apparatus at a location where an aerial splice is located. In this situation, a first fiber optic cable from the left has been spliced to a second fiber optic cable drawn from the right. Here, a sufficient length of slack 85 is provided from the first fiber optic cable so that the splicing operation can be accomplished on the ground. After the splice is completed, splice enclosure 70 is secured to the messenger cable 80 with cable spacers 90. The slack 85 is then supported and maintained with an apparatus, first looping around the upper linear section of the apparatus, and then the lower linear section thereof. Excess slack is pulled taut by moving the apparatus along the messenger 60, at which point the apparatus is secured, for example, at point H.

Although preferred embodiments of the present invention has been described above by way of example, it will be understood by those skilled in the field that modifications may be made to the disclosed embodiments which are within the scope of the invention as defined by the appended claims.

TABLE I

Minimum Bend Radius for
Aerial Installation of
Dielectric Central Member, Non-armored
Fiber Optic Cable

| Fiber Count | Cable Diameter | Minimum Bend Radius | |
|---|---|---|---|
| | | Short-Term | Long-Term |
| 4 | 0.45 in | 8.9 in | 5.9 in |
| 6 | 0.48 | 8.9 | 5.9 |
| 12 | 0.48 | 8.9 | 5.9 |
| 24 | 0.48 | 8.9 | 5.9 |
| 36 | 0.51 | 8.9 | 5.9 |
| 48 | 0.54 | 8.9 | 5.9 |
| 72 | 0.58 | 8.9 | 5.9 |
| 96 | 0.65 | 9.8 | 7.9 |
| 144 | 0.81 | 9.8 | 9.1 |

I claim:

1. In an aerial installation of fiber optic cable, wherein said fiber optic cable has a minimum bending radius and is suspended along its length at spaced-apart intervals by a support structure, an apparatus comprising:

maintenance means for receiving a predetermined section of slack of said suspended fiber optical cable, said predetermined section of slack having a length substantially greater than the height at which said section is suspended on said support structure, and for maintaining said slack at a radius no less than the minimum bending radius of said fiber optic cable; and attachment means connected to said maintenance means for securing said apparatus at selected locations of said support structure.

2. The apparatus of claim 1 wherein said maintenance means comprises:

an elongate member adapted and dimensioned to receive said slack, said elongate member having an arcuate section substantially semi-circular in shape, and a plurality of linear sections for guiding said slack to said arcuate section.

3. The apparatus of claim 2 wherein said elongate member includes a channel along its longitudinal axis for receiving said slack of said fiber optic cable.

4. The apparatus of claim 2 wherein said elongate member is integrally formed.

5. The apparatus of claim 1 wherein said attachment means is detachably securable to said fiber optic cable support structure.

6. The apparatus of claim 1 wherein said attachment means comprises:

a support member connected to said maintenance means; and a coupling member for securing said apparatus to said fiber optic cable support structure.

7. The apparatus of claim 6 wherein said support member has a hole therein through which said coupling member is secured to said fiber optic cable support structure.

8. In an aerial installation of fiber optic cable, wherein aid fiber optic cable has a minimum bending radius and is suspended along its length at spaced-apart intervals by a support structure including a messenger cable, an apparatus comprising:

an integrally-formed elongate member, said elongate member having a channel dimensioned to receive a predetermined section of slack of said suspended fiber optic cable, said predetermined section of slack having a length substantially greater than the height at which said section is suspended on said support structure; and a lip clamp connected to said elongate member for securing said apparatus to said messenger cable.

9. In an aerial installation of fiber optic cable, said fiber optic cable having an originating end and a terminating end and wherein said fiber optic cable has a minimum bending radius and is suspended along its length at spaced-apart intervals by a support structure including a messenger cable, and an apparatus for maintaining a predetermined section of slack of said suspended fiber optic cable, aid predetermined section of slack having a length substantially greater than the height at which said section is suspended on said support structure, said apparatus having an arcuate section and upper and lower linear sections, a method of maintaining said predetermined section of slack, comprising the steps of:

guiding a first fiber optic cable to be spliced, successively, through said upper linear section, said arcuate section, and said lower linear section of said apparatus;

splicing said first fiber optic cable to a second fiber optic cable at a splice enclosure;

securing said splice enclosure to said messenger cable;

attaching said apparatus on said messenger cable at a predetermined distance from said splice enclosure and orienting the arcuate section of said apparatus toward the direction of the terminating end of the support structure; and securing said apparatus to said messenger cable.

10. In an aerial installation of fiber optic cable, said fiber optic cable having an originating end and a terminating end and wherein cable is suspended along its length at spaced-apart intervals by a support structure including a messenger cable, and an apparatus for maintaining a predetermined section of slack of said suspended fiber optic cable, said predetermined section of slack having a length substantially greater than the height at which said section is suspended on said support structure, said apparatus having an arcuate section and upper and lower linear sections, a method of maintaining said predetermined section of slack, comprising the steps of:

guiding said first fiber optic cable to be spliced, successively, through said upper linear section, said arcuate section, and said lower linear section of said apparatus;

splicing said first fiber optic cable to said second fiber optic cable, at a splice enclosure;

securing said splicing enclosure to said messenger cable;

attaching said apparatus on said messenger cable at a predetermined distance from said splice enclosure and orienting the arcuate section of said apparatus toward the direction of the terminating end of the support structure; and securing said apparatus to said messenger cable.

11. In an aerial installation of fiber optic cable, wherein said fiber optic cable is suspended along its length at spaced-apart intervals by a support structure and said length of fiber optic cable includes a predetermined section of slack, said predetermined section of slack having a length substantially greater than the height at which said section is suspended on said support structure, a method of maintaining said predetermined section of slack, comprising the steps of:

attaching an apparatus for maintaining said predetermined section of slack to said fiber optic cable; and securing said apparatus to said support structure.

12. The method of claim 11 wherein said apparatus comprises an elongate member adapted and dimensioned to receive said slack, said elongate member having an arcuate section substantially semi-circular in shape, and a plurality of linear sections for guiding said slack to said arcuate section.

13. The method of claim 12 wherein said support structure comprises a messenger cable.

14. The method of claim 13 wherein said predetermined section of slack has a length equal to approximately twice the height at which said fiber optic cable is suspended on said support structure.

15. The method of claim 13 wherein said predetermined section of slack has a length equal to approximately 60 feet.

16. In an aerial installation of fiber optic cable, wherein said fiber optic cable is suspended along its length at spaced-apart intervals by a support structure and said length of fiber optic cable includes a predetermined section of slack, said predetermined section of slack having a length substantially greater than the height at which said section is suspended on said support structure, comprising the steps of:

attaching first and second apparatus for maintaining said predetermined section of slack to said fiber optic cable; and securing said first and second apparatus to said support structure.

17. The method of claim 16 wherein each of said first and second apparatus comprises:

an elongate member adapted and dimensioned to receive said slack, said elongate member having an arcuate section substantially semi-circular in shape, and a plurality of linear sections for guiding said slack to said arcuate section.

18. In an aerial installation of spliced fiber optic cables, wherein said fiber optic cables are spliced at a splice enclosure and suspended along its length at spaced-apart intervals by a support structure, and said fiber optic cable includes a predetermined section of slack, said predetermined section of slack having a length substantially greater than the height at which said section is suspended on said support structure, a method of maintaining said predetermined section of slack comprising:

attaching said predetermined section of slack to an apparatus for maintaining said predetermined section of slack; and securing said apparatus to said support structure.

19. The method of claim 18, wherein said apparatus comprises:

an elongate member adapted and dimensioned to receive said slack, said elongate member having an arcuate section substantially semi-circular in shape, and a plurality of linear sections for guiding said slack to said arcuate section.

20. The method of claim 19, wherein said support structure comprises a messenger cable.

21. The method of claim 20, wherein said predetermined section of slack has a length equal to approximately twice the height at which said fiber optic cable is suspended on said support structure.

22. The method of claim 20, wherein said predetermined section of slack has a length equal to approximately 60 feet.

* * * * *